(12) United States Patent
Kawano et al.

(10) Patent No.: US 9,759,582 B2
(45) Date of Patent: Sep. 12, 2017

(54) MOTOR ROTATIONAL ANGLE DETECTION DEVICE AND ELECTRIC POWER STEERING DEVICE USING MOTOR ROTATIONAL ANGLE DETECTION DEVICE

(71) Applicant: Mitsubishi Electric Corporation, Tokyo (JP)

(72) Inventors: Yu Kawano, Tokyo (JP); Yoshihito Asao, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 14/915,770

(22) PCT Filed: Feb. 19, 2014

(86) PCT No.: PCT/JP2014/053911
§ 371 (c)(1),
(2) Date: Mar. 1, 2016

(87) PCT Pub. No.: WO2015/125235
PCT Pub. Date: Aug. 27, 2015

(65) Prior Publication Data
US 2016/0231142 A1 Aug. 11, 2016

(51) Int. Cl.
| | | |
|---|---|---|
| G01D 5/244 | (2006.01) |
| B62D 5/04 | (2006.01) |
| H02K 29/08 | (2006.01) |
| H02P 6/16 | (2016.01) |
| H02K 11/215 | (2016.01) |
| H02P 29/00 | (2016.01) |

(52) U.S. Cl.
CPC ......... *G01D 5/24485* (2013.01); *B62D 5/046* (2013.01); *B62D 5/049* (2013.01);
(Continued)

(58) Field of Classification Search
CPC .......... G01D 5/24485; G01D 5/24471; G01D 5/24457; G01D 5/24461; H02K 11/215;
(Continued)

(56) References Cited

U.S. PATENT DOCUMENTS 5,260,877 A    11/1993  Drobny et al.
6,791,219 B1*  9/2004  Eric ................... H02K 11/215
                                                    310/68 B
(Continued)

FOREIGN PATENT DOCUMENTS

JP       4-214949 A      8/1992
JP    2005-335591 A     12/2005
(Continued)

OTHER PUBLICATIONS

Communication dated Nov. 1, 2016, from the Japanese Patent Office in counterpart Japanese application No. 2016-503823.
International Search Report for PCT/JP2014/053911 dated May 13, 2014 [PCT/ISA/210].

*Primary Examiner* — Son Le
*Assistant Examiner* — Dustin Dickinson
(74) *Attorney, Agent, or Firm* — Sughrue Mion, PLLC; Richard C. Turner

(57) ABSTRACT

According to a motor rotational angle detection device which includes a plurality of motor rotational angle detection units which detect a rotational angle of a motor, and a normal angle decision device which includes a motor rotational angle information item and decides a normal motor rotational angle, in which when a difference is caused between output values of the plurality of motor rotational angle detection units, the normal angle decision device respectively compares the output value of each of the motor rotational angle detection units with the motor rotational angle information item included in the normal angle decision device, and identifies the normal motor rotational angle detection unit, and decides the normal motor rotational angle.

20 Claims, 13 Drawing Sheets

(52) U.S. Cl.
CPC ........... *H02K 11/215* (2016.01); *H02K 29/08* (2013.01); *H02P 6/16* (2013.01); *H02K 2213/06* (2013.01); *H02P 29/00* (2013.01)

(58) Field of Classification Search
CPC .... H02K 29/08; H02K 2213/06; B62D 5/046; B62D 5/0481; B62D 5/0484; H02P 6/16; H02P 29/00
See application file for complete search history.

(56) References Cited

U.S. PATENT DOCUMENTS

| | | | |
|---|---|---|---|
| 2009/0267594 A1* | 10/2009 | Kather | G01B 7/30 324/207.25 |
| 2012/0046832 A1* | 2/2012 | Kariatsumari | B62D 5/0463 701/41 |
| 2012/0116717 A1* | 5/2012 | Satou | G01D 5/24457 702/151 |
| 2014/0191625 A1* | 7/2014 | Kitamoto | G01D 3/08 310/68 B |

FOREIGN PATENT DOCUMENTS

| | | |
|---|---|---|
| JP | 2006-306166 A | 11/2006 |
| JP | 2011-51537 A | 3/2011 |
| JP | 2012-182929 A | 9/2012 |
| JP | 2014-7784 A | 1/2014 |

\* cited by examiner

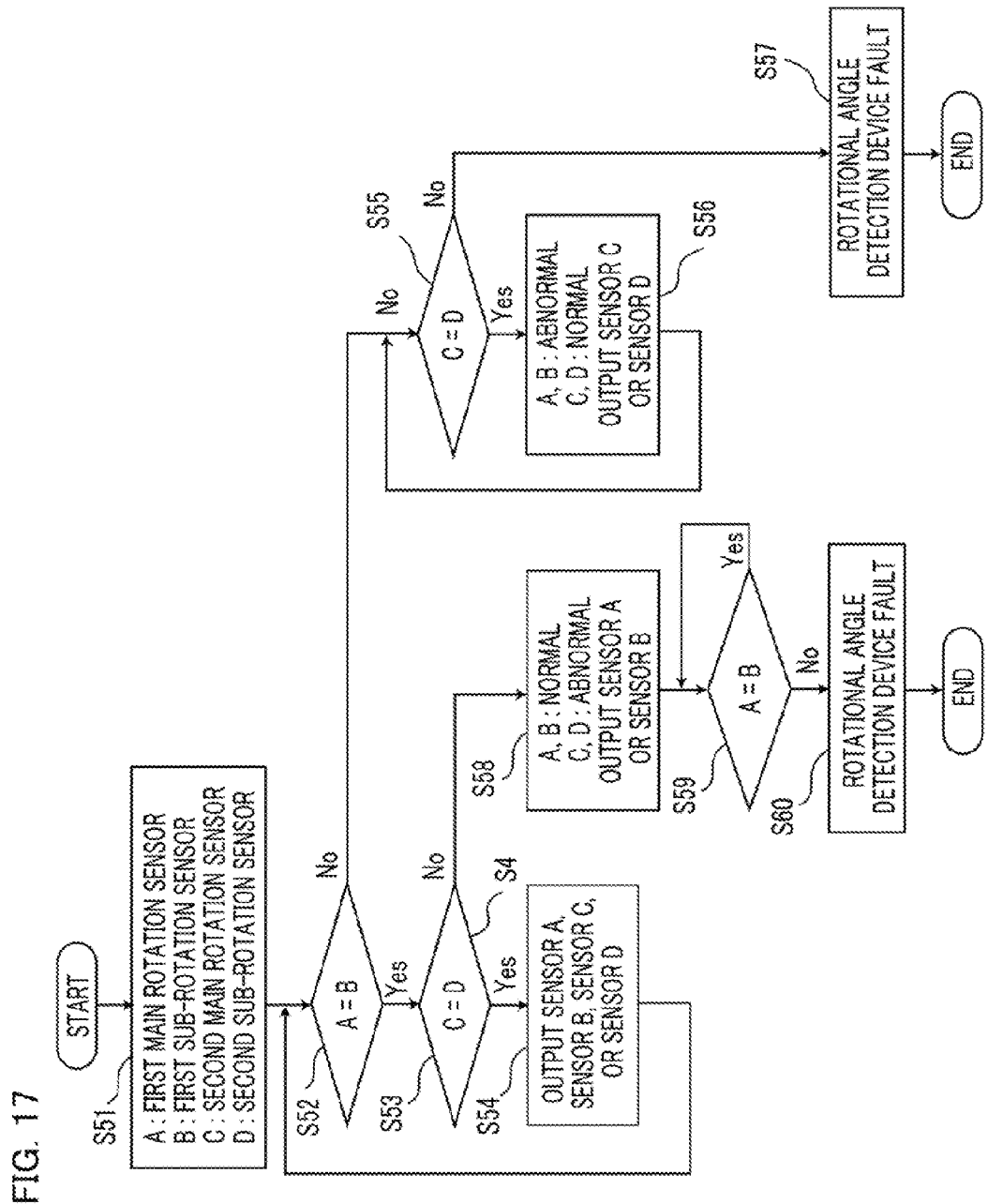

MOTOR ROTATIONAL ANGLE DETECTION DEVICE AND ELECTRIC POWER STEERING DEVICE USING MOTOR ROTATIONAL ANGLE DETECTION DEVICE

CROSS REFERENCE TO RELATED APPLICATIONS

This application is a National Stage of International Application No. PCT/JP2014/053911, filed on Feb. 19, 2014, the contents of all of which are incorporated herein by reference in their entirety.

TECHNICAL FIELD

The present invention relates to a motor rotational angle detection device which drives and controls a motor, and relates to an electric power steering device which uses the motor rotational angle detection device.

BACKGROUND ART

In a motor such as a brushless motor, a rotation sensor is provided in order to detect a rotational angle of the motor, and a motor current is controlled in accordance with the rotational angle of the motor, which is detected by the rotation sensor. In this control system, when the rotation sensor is broken down, and a normal information item of the rotational angle of the motor is not obtained, a motor control operation cannot be continued. In a conventional art, as described in Patent Document 1, duplexed sensors are provided with respect to the sensor fault, and when a broken wire or a short circuit is caused in each of the sensors, a method, which detects an abnormality of the sensors, is used.

CONVENTIONAL ART DOCUMENT

Patent Document

Patent Document 1: Japanese Laid-Open Patent Publication No. H04-214949

SUMMARY OF THE INVENTION

Problems to be Solved by the Invention

However, in the conventional art, although the duplexed sensors are the sensors which respectively detect a position of the same object, it is assumed that an output value of a main sensor and an output value of a sub-sensor are varied each other in a reverse direction, and there is a problem in that an abnormality cannot be detected when a sensor, which has not the characteristic, is provided, or when a fault mode, in which a broken wire or a short circuit is excepted, is caused. Therefore, if a plurality of sensors is included, when an abnormality is caused in the sensors, it cannot be identified that a fault is caused in any one of the sensors, and there is a problem in that a normal output value cannot be continuously outputted.

The present invention has been made to solve the above-described problems, and an object of the invention is to provide a motor rotational angle detection device which continuously outputs a normal rotational angle even when an abnormality is caused in any one of multiple motor rotational angle detection units.

Means for Solving Problems

A motor rotational angle detection device of the present invention includes a plurality of motor rotational angle detection units which detect a rotational angle of a motor; and a normal angle decision device which includes a motor rotational angle information item and decides a normal motor rotational angle; wherein when a difference is caused between output values of the plurality of motor rotational angle detection units, the normal angle decision device respectively compares the output value of each of the motor rotational angle detection units with the motor rotational angle information included in the normal angle decision device, and identifies the motor rotational angle detection unit, in which a difference is small, as the normal motor rotational angle detection unit, and decides the normal motor rotational angle.

Effects of the Invention

In a motor rotational angle detection device according to the present invention, a plurality of motor rotational angle detection units are included, and when an abnormality is caused in any one of the motor rotational angle detection units, a normal motor rotational angle detection unit is identified by a normal angle decision device, whereby it can be realized that a normal motor rotational angle is decided so as to be outputted.

An aim, a characteristic, a viewpoint, and an effect of the present invention, which are not described in the above explanations, will be cleared by the following detail explanations for the present invention in reference to drawings.

BRIEF DESCRIPTION OF THE DRAWINGS

FIG. 17 is a flowchart for explaining an operation of the motor rotational angle detection device according to Embodiment 4.

MODE FOR CARRYING OUT THE INVENTION

Embodiment 1

Figure 1:
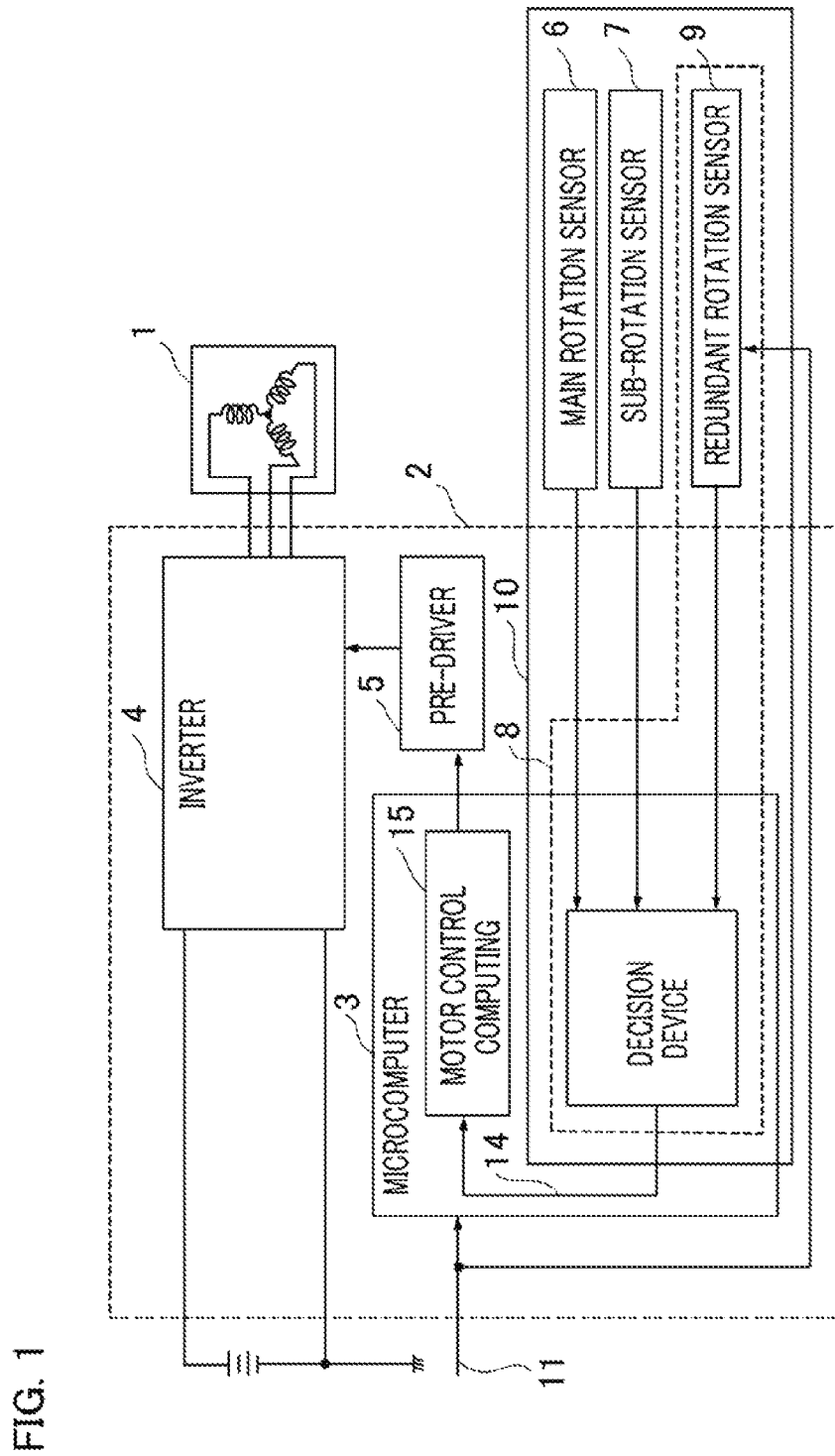
FIG. 1 is a block diagram illustrating a motor control system in which a motor rotational angle detection device according to Embodiment 1 of the present invention is used for an electric power steering device.

A motor rotational angle detection device according to Embodiment 1 of the present invention will be explained in reference to drawings. Reference symbols, which are the same as those in each of FIGS. 1 through 17, refer to the same or equivalent parts. FIG. 1 is a block diagram illustrating a motor control system in which a motor rotational angle detection device according to Embodiment of the present invention is used for an electric power steering device. A motor 1 is driven and controlled by a control unit 2. The control unit 2 is composed of an inverter 4 which drives the motor 1, a microcomputer 3 which controls the motor 1, a pre-driver 5 which outputs a voltage instruction to the inverter 4 in accordance with an instruction of the microcomputer 3, and a motor rotational angle detection device 10. The motor rotational angle detection device 10 is composed of a main rotation sensor 6 which detects a rotational angle of the motor 1, a sub-rotation sensor 7, and a normal angle decision device 8 in which a redundant rotation sensor 9 is used. The normal angle decision device 8 outputs a decided normal motor rotational angle 14, and the microcomputer 3 computes (motor control computing 15) a required assist torque by using the outputted motor rotational angle 14, and the motor 1 is driven by the inverter 4 via the pre-driver 5.

In the electric power steering device according to Embodiment 1, an operation, in a case where an ignition (switch) of a vehicle is turned on, is different from an operation, in a case where the ignition (switch) is turned off so that the operations will be individually explained.

Firstly, the operation, in a case where the ignition is turned on, will be explained. When the ignition is turned on in the electric power steering device, a steering torque, which is applied to a steering while of a vehicle, is detected by a torque sensor, and a sub-steering torque corresponding to the steering torque is generated by an electric motor, and a steering operation of the while is performed. Hereinafter, a motor control operation will be explained. The microcomputer 3 is initiated in accordance with an ignition signal 11, and the motor control operation is started. A rotational position of a rotor of the motor 1 is detected by the main rotation sensor 6, and the microcomputer 3 computes (motor control computing 15) a required assist torque by using the detected motor rotational angle, and the motor 1 is driven by the inverter 4 via the pre-driver 5.

Figure 2:
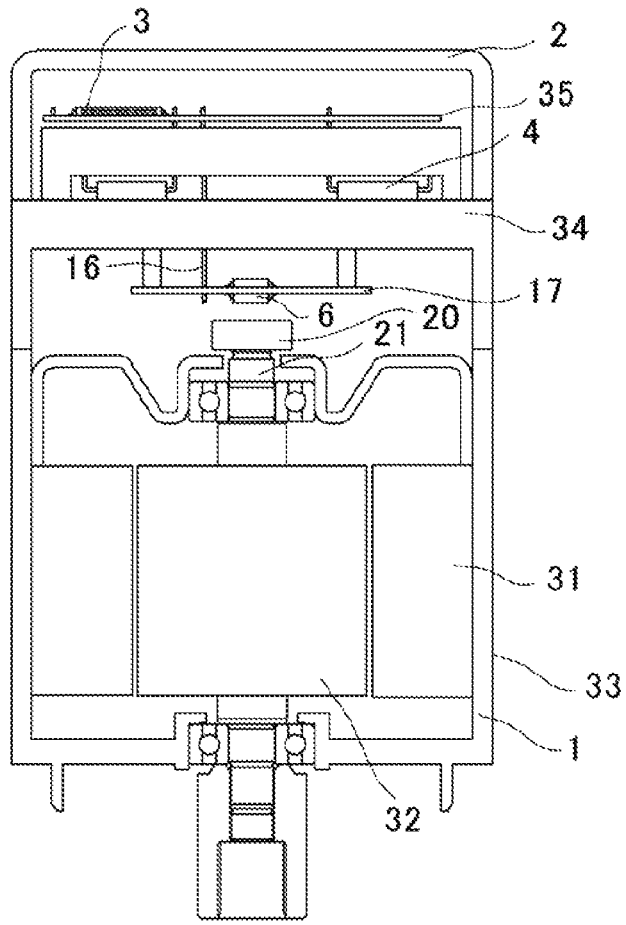
FIG. 2 is a cross-sectional view illustrating a motor controller for the electric power steering device according to Embodiment 1, in which a motor and a control unit are integrated.

The rotation sensors will be explained in reference to FIG. 2. FIG. 2 is a cross-sectional view illustrating a motor controller for the electric power steering device, in which the motor 1 and the control unit 2 are integrated. A rotor 32 and a stator 31 are installed in a motor case 33, and the control unit 2 is arranged at an opposite side of an output shaft of the motor 1. In a configuration of the control unit 2, the inverter 4, which is used as a power module, is mounted on a heat sink 34, and microcomputer 3, which controls the inverter 4, is mounted on a control board 35. The rotation sensors, which sandwich the heat sink 34, are mounted on a rotation sensor board at an opposite position with respect to the control board 35, in other words, at a position near the motor 1. The rotation sensor board 17 and the control board 35 are linked via a signal terminal 16, and a signal is transmitted, and a power source is supplied.

The main rotation sensor 6 is mounted on the rotation sensor board 17. The main rotation sensor 6 is mounted in such a way that the main rotation sensor 6 is faced to a magnet 20 for the sensor 6, which is provided at a shaft end of a shaft 21 of the motor 1. When the shaft 21 of the motor 1 is rotated, the magnet 20, which is provided at a tip of the shaft 21, is rotated, and a magnetic field, which is caused by the magnet 20, is varied in accordance with a rotation of the magnet 20. The main rotation sensor 6 is composed of, for example, a magnetic resistance element, and the main rotation sensor 6 is used as a sensor by which a rotation magnetic field of the magnet 20 is detected. The main rotation sensor 6 may be composed of a hall element.

The magnetic resistance element is configured by a bridge circuit which is composed of at least a pair of magnetic detection elements (MR element and hall element) which are arranged in such a way that a phase is deviated at an angle of 90 degrees in accordance with a rotational angle. In the motor rotational angle detection device 10 which is configured as described above, a sign wave (sin θ) signal and a cosign wave (cos θ) signal, which are corresponded to a rotational angle θ of the motor 1, are outputted to the microcomputer 3. The signals are outputted to the microcomputer 3, and the microcomputer 3 performs a computing process of an arctangent function (arctan θ) in accordance with the angle information items, whereby the rotational angle is obtained.

Figure 3:
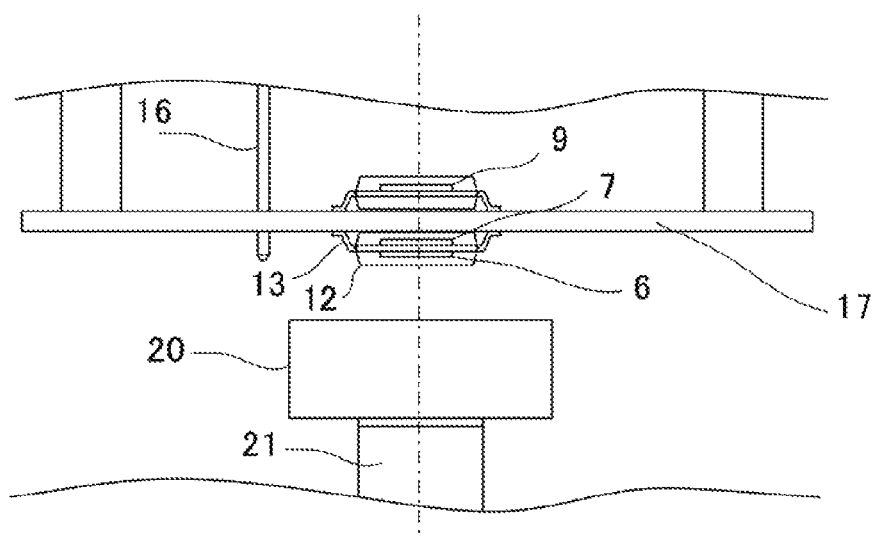
FIG. 3 is a cross-sectional view in which peripherals of rotation sensors in FIG. 2 are enlarged.

FIG. 3 is a cross-sectional view in which peripherals of the rotation sensors in FIG. 2 are enlarged. The rotation sensor board 17 is provided at a position where the rotation sensor board 17 is faced to the magnet 20, and the main rotation sensor 6 and the sub-rotation sensor 7 are mounted at a surface, which is near to the magnet 20 and is located at a position extended from a shaft (rotation shaft) of the motor 1, of the rotation sensor board 17. In this case, the main rotation sensor 6 and the sub-rotation sensor 7 are mounted at both surfaces on a lead frame 13 of the same package 12. When central axes of the rotation sensors are deviated from the shaft of the motor 1 which is a detected object, detection accuracy is decreased. However, when the rotation sensors are mounted as indicated in FIG. 3, the central axes of the main rotation sensor 6 and the sub-rotation sensor 7 are not deviated from the shaft of the motor 1 which is the detected object, so that the detection accuracy of the outputted values from the both rotation sensors is improved. The redundant rotation sensor 9 is mounted at the other surface, which is distant from the magnet 20 and is located at a position extended from the shaft of the motor 1, of the rotation sensor board 17. The redundant rotation sensor 9 can be operated as a rudder angle sensor.

Figure 4:
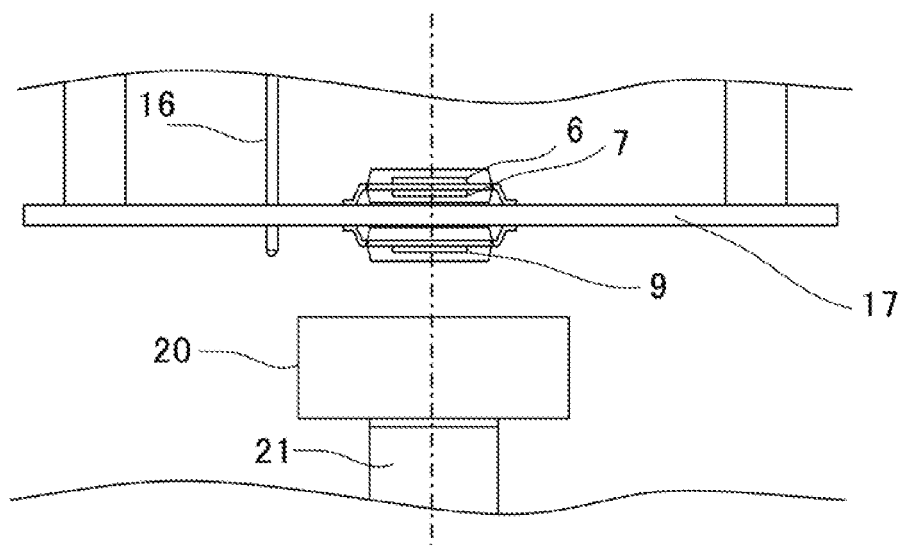
FIG. 4 is the other cross-sectional view in which the peripherals of the rotation sensors in FIG. 2 are enlarged.

Moreover, as indicated in FIG. 4, it is possible that an arrangement of the rotation sensors on the rotation sensor board 17 is reverse to an arrangement of the rotation sensors in FIG. 3. In other words, it is possible that the redundant rotation sensor 9 is mounted at a surface, which is near to the magnet 20 and is located at a position extended from the shaft of the motor 1, of the rotation sensor board 17, and the main rotation sensor 6 and the sub-rotation sensor 7 are mounted at the other surface, which is distant from the magnet 20 and is located at a position extended from the shaft of the motor 1, of the rotation sensor board 17. The redundant rotation sensor 9 can be operated as a rudder angle sensor. Moreover, the positions of the main rotation sensor 6 and the sub-rotation sensor 7 can be exchanged in accordance with usage. For example, there is a position at which a uniform magnetic flux density is obtained in accordance with a distance from the magnet 20, and there is a case in which detection accuracy is improved when a uniform magnetic field is obtained. Moreover, there is a case in which the output is saturated by a strong magnetic field in accordance with a used magnetic resistance element (for example, a hall element), and there is a case in which an element (for example, a large magnetic resistance element) is destroyed by a strong magnetic field, so that there is a case in which the mounting positions of the main rotation sensor 6, the sub-rotation sensor 7, and the redundant rotation sensor 9 are exchanged in order to configure a system having optimum accuracy.

Figure 5:
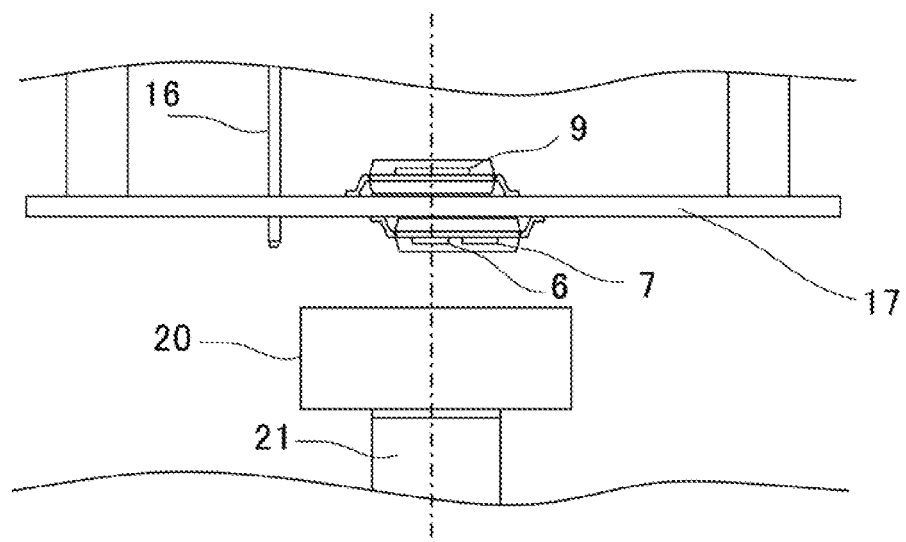
FIG. 5 is the still other cross-sectional view in which the peripherals of the rotation sensors in FIG. 2 are enlarged.

Moreover, as illustrated in FIG. 5, there is a case in which the main rotation sensor 6 and the sub-rotation sensor 7 are adjacently arranged at a surface which is near to the magnet 20, in this case, although a central axis of only one sensor can be aligned with a position extended from the shaft of the motor 1, the both sensors detect a rotation magnetic field of the magnet 20 from the same direction, so that rotation directions of output values are aligned, and a process using a rotational angle is easily performed at a control timing or a fault detection timing. In contrast, as illustrated in FIG. 3, when the main rotation sensor 6 and the sub-rotation sensor 7 are respectively mounted on a front surface and a back surface, the output values of the both sensors are outputted as the rotation values in a reverse direction in accordance with a specification of the sensors, so that there is a possibility in which the process is complicated.

The redundant rotation sensor 9 will be explained in reference to FIG. 3. The redundant rotation sensor 9 is mounted at the other surface, which is distant from the magnet 20, of the rotation sensor board 17. The three rotation sensors are mounted at both surfaces of the rotation sensor board 17, whereby the three rotation sensors are aligned at a position extended from the shaft of the motor 1, so that the detection accuracy of the sensors is improved. A function of the redundant rotation sensor 9 will be explained in the following case in which a fault is caused.

Figure 6:
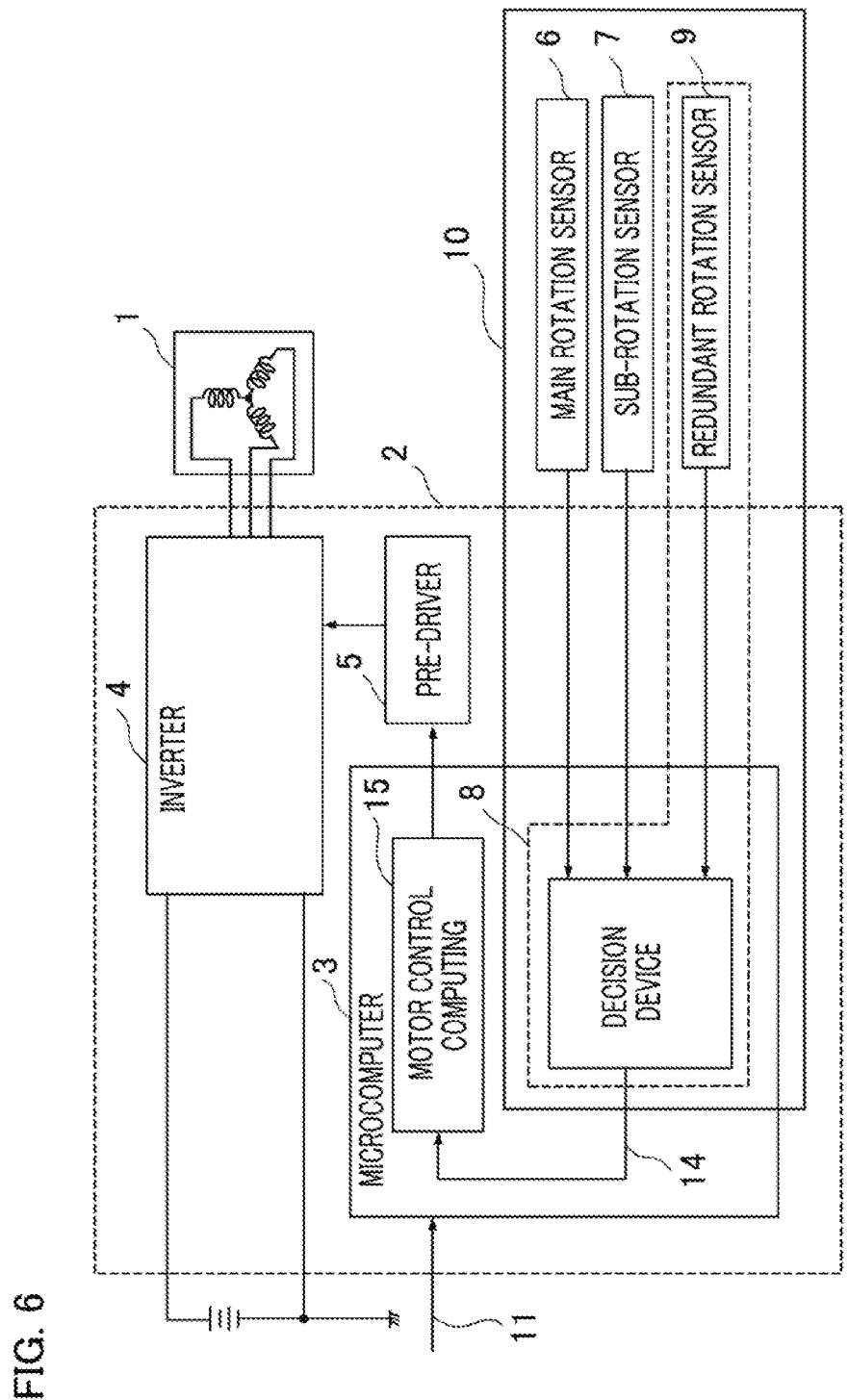
FIG. 6 is a block diagram in which an ignition is turned on in the motor rotational angle detection device according to Embodiment 1.

Hereinafter, an operation of the normal angle decision device (unit) 8 will be explained in a case where a fault is caused in the rotation sensors. FIG. 6 is a block diagram in which an ignition is turned on in the motor rotational angle detection device according to Embodiment 1. A rotational angle is detected by using the main rotation sensor 6 and the sub-rotation sensor 7, and the output values, which are outputted from the both rotation sensors, are compared. When there is a case in which a difference, which is greater than or equal to a predetermined value (for example, 10%), exists between the compared output values, it is recognized that a fault is caused in the main rotation sensor 6 or the sub-rotation sensor 7. In addition, in each of Embodiments, when there is a description of a case in which a difference exists between the output values, the description represents a case in which a difference, which is greater than or equal to a predetermined value (for example, 10%), exists between the output values.

There is a case in which a fault cannot be detected by using a fault detection decision value, which is provided in each of the sensors, in accordance with a fault mode of the rotation sensor. When a wire is broken or a short circuit is caused, the output value of the sensor is reached a minimum value or a maximum value, so that a fault can be detected. However, there is a fault in which the output value of the sensor is fixed at an intermediate value within a range of the output value of the sensor, and the output value of the sensor is outputted within a normal range in this case, so that the output value of the sensor is not detected as an abnormal value. Therefore, double rotation sensors are provided by using the main rotation sensor 6 and the sub-rotation sensor 7, and the output values of the sensors are compared each other, whereby an abnormality, in which the output values are fixed within a normal range, can be detected.

However, it cannot be identified in this moment that a fault is caused in the main rotation sensor 6 or the sub-rotation sensor 7. Therefore, the output values of the main rotation sensor 6 and the sub-rotation sensor 7 are compared with the output value of the redundant rotation sensor 9. When double faults are not caused, each of the output values of main rotation sensor 6 and the sub-rotation sensor 7 is compared with a motor rotational angle information item, which is obtained from the redundant rotation sensor 9, of the normal angle decision device 8, and a motor rotational angle detection unit, in which a difference is small, is identified as a normal motor rotational angle detection unit, whereby a normal motor rotational angle can be decided.

In a conventional electric power steering device, when a fault is caused in a system, the fault is detected, and an assist operation is cut off. However, in a recent year, it is required that a driver does not steer a steering wheel when a vehicle is automatically driven or automatically parked, and the system steers the steering wheel. As described above, when the driver does not directly control a handle, and a fault is caused in the electric power steering device, and the assist operation is cut off a car body cannot be controlled in a similar operation of a handle locking or a self-assist, and there is a possibility in which an accident is caused. Therefore, there is a required system in which an assist operation is not cut off when a fault is caused in the system, and the fault is detected, and the assist operation is continued.

In the present invention, the motor rotational angle detection device includes a plurality of motor rotational angle detection units (the main rotation sensor 6 and the sub-rotation sensor 7), which detect the motor rotational angle, and the normal angle decision device 8, which includes the motor rotational angle information item (the redundant rotation sensor) and detects the normal motor rotational angle, and when a difference is caused between the output values of the plurality of motor rotational angle detection units, the normal angle decision device 8 respectively compares each of the output values of the motor rotational angle detection units with the motor rotational angle information item included in the normal angle decision device 8, and the motor rotational angle detection unit, in which the difference is small, is identified as the normal motor rotational angle detection unit, whereby the normal motor rotational angle can be decided. In addition, when a difference is not caused between the output values of the motor rotational angle detection units, it is not required that the normal angle decision device 8 respectively compares each of the output values of the motor rotational angle detection units with the motor rotational angle information item included in the normal angle decision device 8. Therefore, when a difference is not caused between the output values of the plurality of motor rotational angle detection units, a load of the operation is small.

Figure 7:
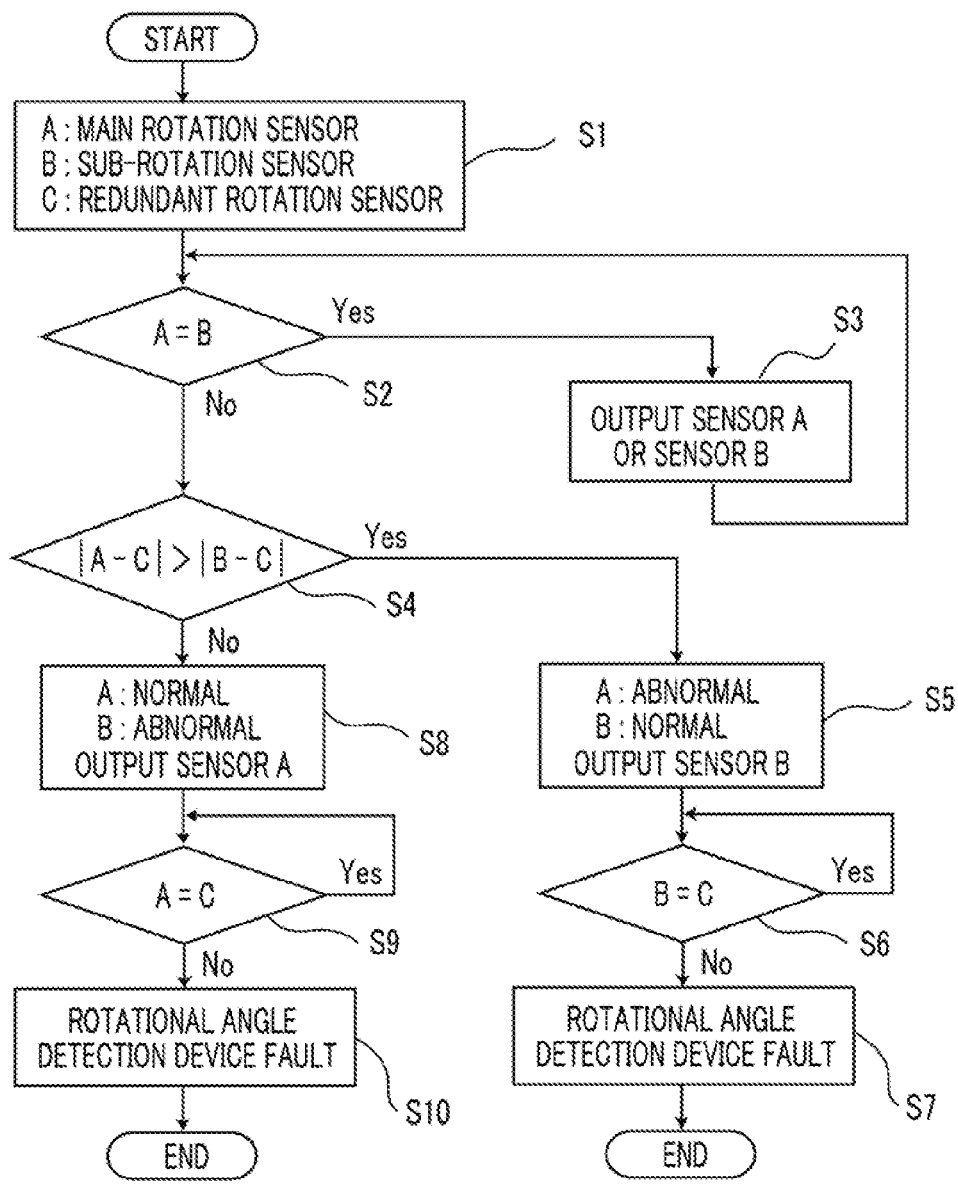
FIG. 7 is a flowchart for explaining an operation of the motor rotational angle detection device according to Embodiment 1.

FIG. 7 is a flowchart for explaining an operation of the motor rotational angle detection device according to Embodiment 1. An output A (rotational angle) is obtained from the main rotation sensor 6, and an output B is obtained from the sub-rotation sensor 7, and an output C is obtained from the redundant rotation sensor 9 (S1) (symbol "S" represents a step, and it similarly represents a step in the following description). The output A is compared with the output B at S2, and when a difference is not caused (S2, Yes), the output A or the output B is outputted as a normal rotational angle (S3). The output A is compared with the output B at S2, and when a difference is caused (S2, No), the normal angle decision device 8 decides a formula "|A−C|>|B−C|" (S4). When the decision is "Yes" at S4, it is decided that the output A is abnormal and the output B is normal, and the output B is outputted as a normal rotational angle (S5). Moreover, the output B is compared with the output C, and when a difference is caused (S6, No), it is decided that a fault is caused in the motor rotational angle detection device 10 (S7). In addition, the output B is compared with the output C at 86, and when a difference is not caused, a periodic decision is performed at S6. On the other hand, when the decision is "No" at S4, it is decided that the output A is normal and the output B is abnormal, and the output A is outputted as a normal rotational angle (S8). Moreover, the output A is compared with the output C at 89, and when a difference is caused (S9, No), it is decided that a fault is caused in the motor rotational angle detection device 10 (S10).

Moreover, the normal angle decision device 8 respectively compares the output value of each of the motor rotational angle detection units with the motor rotational angle information item included in the normal angle decision device 8, when a difference between the motor rotational angle information item, which is included in the normal angle decision device 8, and the output value of each of the motor rotational angle detection units is greater than or equal to a predetermined value, the normal angle decision device 8 informs an abnormality of the difference to the outside device of the electric power steering device.

Because three rotation sensors are mounted, when a fault is caused in one sensor, it can be identified that any sensor is broken down, and an assist operation can be continued by the remaining sensors. After the fault of the rotation sensor is detected, in order to continue the assist operation by the system, the following realization method is used in Embodiment 1.

When the output value of the main rotation sensor 6 is compared with the output value of the sub-rotation sensor 7, and a fault is detected in a state where a difference between the output values of the both sensors is greater than or equal to a predetermined value, the output value of the main rotation sensor 6 and the output value of the sub-rotation sensor 7 are respectively compared by using the output value of the redundant rotation sensor 9, and the rotation sensor, in which a difference is small, is identified as the normal rotation sensor, and the output value of the normal rotation sensor is used as a rotational angle, whereby the assist operation is continued.

As illustrated in FIG. 3, when the main rotation sensor 6 and the sub-rotation sensor 7 are mounted at a surface, which is near to the magnet 20, of the rotation sensor board 17, the detected magnetic flux density is increased, and the detection accuracy of the rotational angle is increased. When the redundant rotation sensor 9 is mounted at the other surface, which is distant from the magnet 20, of the rotation sensor board 17, there is a case in which the detected magnetic flux density is decreased, and the detection accuracy of the rotational angle is decreased. In this case, when the redundant rotation sensor 9 is used in a state where the output value of the redundant rotation sensor 9 is respectively compared with the output value of the main rotation sensor 6 and the output value of the sub-rotation sensor 7, and any rotation sensor (the main rotation sensor 6 or the output value of the sub-rotation sensor 7) is detected as a normal rotation sensor, it is not a problem that the detection accuracy of the rotational angle is decreased. Therefore, the normal rotation sensor having high accuracy (the main rotation sensor 6 or the sub-rotation sensor 7) can be identified, and the assist operation having high accuracy can be continued.

Moreover, in the other method, the output value of the main rotation sensor 6 is compared with the output value of the sub-rotation sensor 7, and when a fault is detected in a state where a difference between the output values of the both sensors is greater than or equal to a predetermined value, the both output values of the main rotation sensor 6 and the sub-rotation sensor 7 are not used, and the output value of the redundant rotation sensor 9 is used as a rotational angle of the normal rotation sensor, whereby the assist operation is continued. In such a case where the main rotation sensor 6 and the sub-rotation sensor 7 are installed in the same package, there is a possibility in which the sensors are concurrently broken down by a power source fault, a short circuit between pins or the like, so that the sensors are feared, and it is possible that the output value of the redundant rotation sensor 9 is used as a normal motor rotational angle. As described above, when the fault is caused in the main rotation sensor 6 or the sub-rotation sensor 7, it is required that the assist operation is continued in accordance with the used rotational angle, so that there are many cases in which a smooth assist control is not required by using a high accuracy rotational angle before the fault is caused, and it is possible that the accuracy is decreased by using the rotational angle of the redundant rotation sensor 9.

Figure 8:
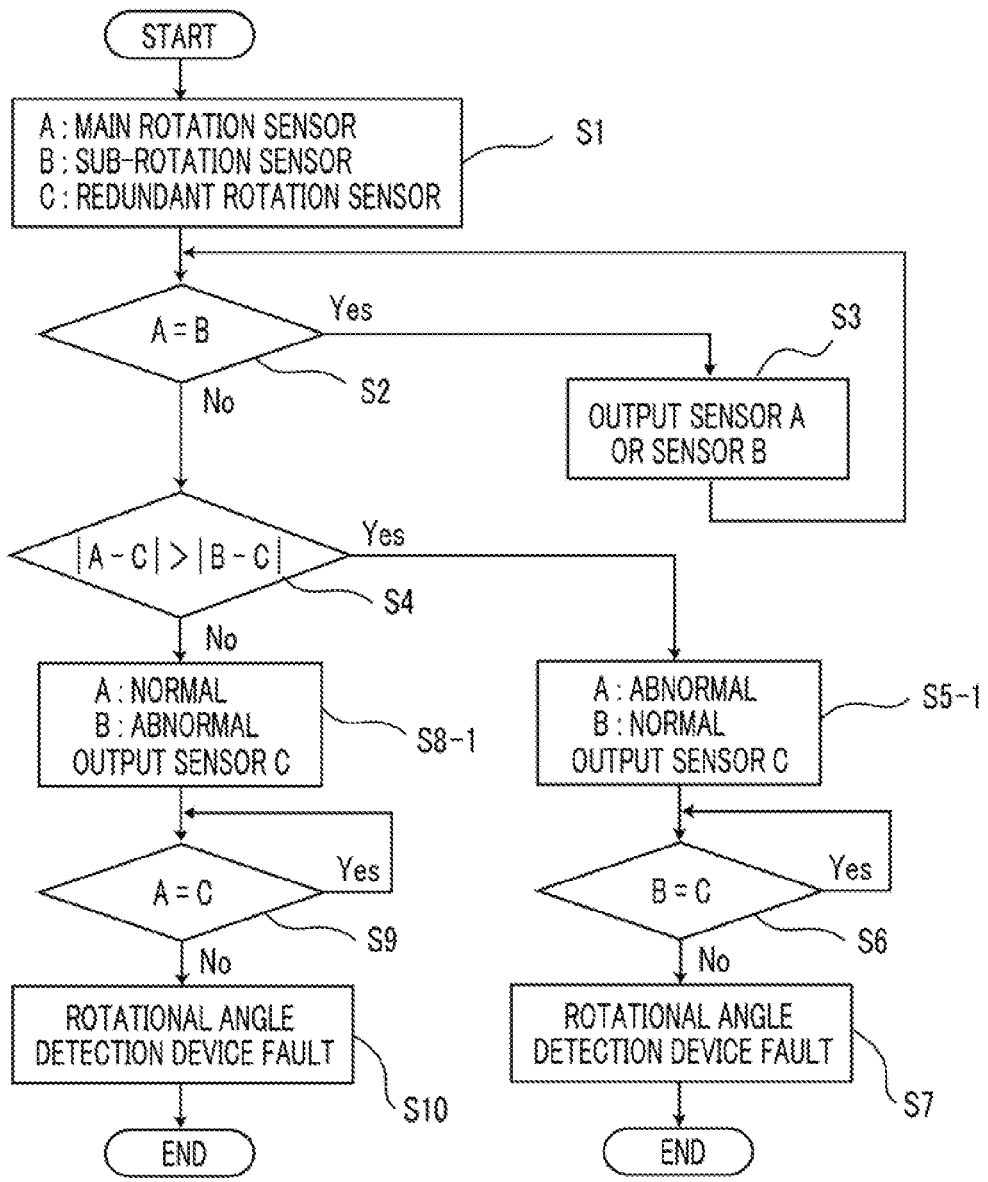
FIG. 8 is a flowchart for explaining the other operation of the motor rotational angle detection device according to Embodiment 1.

FIG. 8 is a flowchart for explaining the other operation of the motor rotational angle detection device according to Embodiment 1. The operation, which is different from the operation in the flowchart indicated in FIG. 7, will be explained. The normal angle decision device 8 decides a formula "|A−C|>|B−C|" at S4, and when the decision is "Yes" at S4, although it is decided that the output A is abnormal and the output B is normal, the output C is outputted as a normal rotational angle (S5-1). On the other hand, when the decision is "No" at S4, although it is decided that the output A is normal and the output B is abnormal, the output C is outputted as a normal rotational angle (S8-1). As described above, when it is decided that a fault is caused in the main rotation sensor 6 or the sub-rotation sensor 7, the output value of the redundant rotation sensor 9 may be outputted as a normal motor rotational angle.

Moreover, as illustrated in FIG. 3, the redundant rotation sensor 9 is mounted at the surface, which is distant from the magnet 20, of the rotation sensor board 17, so that there is a case in which the detection accuracy of the rotational angle is decreased. Even in this case, the redundant rotation sensor 9 has sufficient accuracy when the sensor is used as a rotational angle sensor after a fault is caused.

In this case, as described above, although the output values of the main rotation sensor 6 and the sub-rotation sensor 7 are the sign wave (sin θ) signal and the cosign wave (cos θ) signal, which are respectively corresponded to the rotational angle θ of the motor 1, the redundant rotation sensor 9 may be used as a sensor in which a computing portion is provided, whereby a computing process of the arctangent function (arctan θ), which is performed by the microcomputer 3, is performed in the sensor, and the rotational angle, which is obtained by the computing process, is transmitted by digital communication. In this case, the digital communication is a pulse output method such as SPI (Serial Peripheral Interface), PWM or the like. In other words, the redundant rotation sensor 9, which is used for deciding an abnormality, and the main rotation sensor 6 and the sub-rotation sensor 7, which are the decided sensors, have different output formats. Thereby the normal angle decision device 8 can perform a decision including a computing process at a rear step of the decided sensors.

Moreover, an analog output method for outputting the sign wave is basically different from a digital output method for outputting the computed rotational angle, so that a fault of a common cause can be decreased when the fault is caused. For example, when a noise is mixed in a line for transmitting an output value and an abnormality is caused, although an analog sensor directly receives an influence with respect to an AD value, CRC (Cyclic Redundancy Check) or the like is included in a communication signal at a digital output sensor, whereby an influence of the noise can be reduced in a transmission line.

Moreover, when a difference is caused between the output value of the main rotation sensor 6 and the output value of the sub-rotation sensor 7, although the normal angle decision device 8 identifies a normal rotation sensor, the rotational angle of the redundant rotation sensor 9 is respectively compared with the rotational angle of the main rotation sensor 6 and the rotational angle of the sub-rotation sensor 7 before the difference is caused between the rotational angle of the main rotation sensor 6 and the rotational angle of the sub-rotation sensor 7, and when the rotational angle of the redundant rotation sensor 9 is different from the rotational angle of the main rotation sensor 6 and the rotational angle of the sub-rotation sensor 7, the microcomputer 3 decides that an abnormality of the normal angle decision device 8 is caused. Thereby an error decision, which is caused by the normal angle decision device 8, can be prevented.

Figure 9:
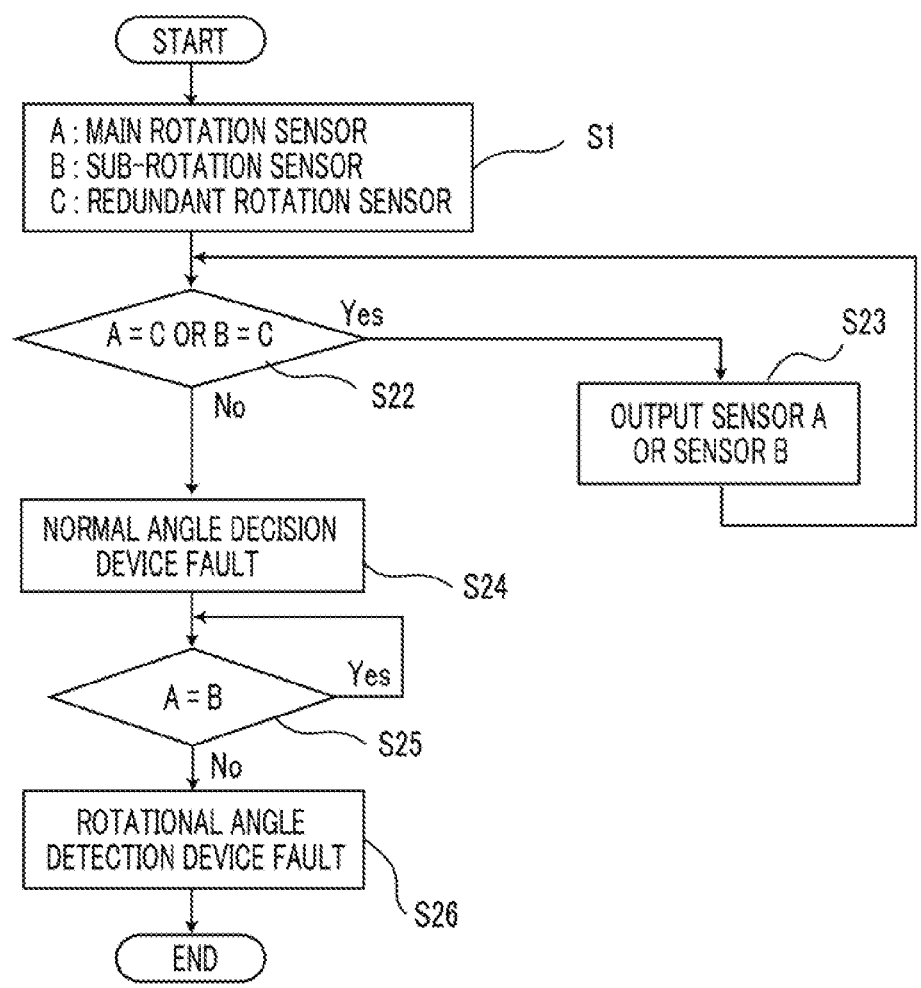
FIG. 9 is a flowchart for explaining the still other operation of the motor rotational angle detection device according to Embodiment 1.

FIG. 9 is a flowchart for explaining the still other operation of the motor rotational angle detection device according to Embodiment 1. The operation, which is different from the operation in the flowchart indicated in FIG. 7, will be explained. The output C is respectively compared with the output A and the output B at 822, when a difference is not cased in the both comparison operations (S22, Yes), the output A or the output B is outputted as a normal motor rotational angle (S23). On the other hand, when a difference is cased in the both comparison operations (822, No), it is decided that a fault is caused in the normal angle decision device 8 (824). Moreover, when a difference is cased between the output A and the output B (825, No), it is decided that a fault is caused in the motor rotational angle detection device 10 (826).

Next, in order to use the output value of the sensor after a single fault of the rotation sensor is caused, it is required that a reliability of the motor rotational angle detection device 10 is increased with respect to double faults. If the main rotation sensor 6 is broken down in the main rotation sensor 6 and the sub-rotation sensor 7, in order to more detect whether a fault is caused or not caused in the sub-rotation sensor 7 which is identified as a normal sensor after the main rotation sensor 6 is broken down, it is recognized that a difference is not caused between the output value of the sub-rotation sensor 7 and the output value of the redundant rotation sensor 9. When a difference is caused, it is required that an abnormality of the motor rotational angle detection device 10 is informed to the outside device. Thereby, when a single fault is caused, a normal sensor is identified, and a normal motor rotational angle is outputted, and it is recognized that a fault is not caused with respect to the motor rotational angle of the rotation sensor which is identified as a normal sensor, and when an abnormality is caused, the abnormality is informed to the outside device, whereby it can be prevented that an abnormal rotational angle is used.

A function, which is used when the ignition is turned on, can be realized only by a block diagram illustrated in FIG. 6. FIG. 1 corresponding FIG. 6 is a block diagram in which an operation of the rotation sensor is varied in accordance with the ignition signal 11.

Hereinafter, an operation, in a case where the ignition is turned off, will be explained. When the ignition is turned off, an assist operation is not required in the electric power steering device. However, it is required in a recent year that a function of a rudder angle sensor is included in the electric power steering device. The electric motor of the electric power steering device is linked to the steering shaft via a gear, so that a steering angle, in other words, a steering rudder angle can be detected by using a rotational angle of the electric motor of the electric power steering device.

When the ignition is turned on, the electric motor is controlled, and the motor rotational angle is detected, so that a rudder angle is computed by using the motor rotational angle, and the rudder angle can be transmitted to the other device in a vehicle. In the other case, when the ignition is turned off, the electric motor is not controlled, and the motor rotational angle is not detected. However, there is a case in which a handle is rotated even when the ignition is turned off so that in order to accurately detect the rudder angle by the electric power steering device, it is required that the motor rotational angle is detected even when the ignition is turned off.

In FIG. 1, an operation in the block diagram (system) will be explained when the ignition is turned off. When the ignition is turned on, although the normal angle decision device 8 according to the redundant rotation sensor 9 includes a function by which a normal side of the main rotation sensor 6 and the sub-rotation sensor 7 is identified, and when a state, in which the ignition is turned off is detected by using an ignition signal, the normal angle decision device 8 functions as a rudder angle sensor.

When the ignition is turned off, the redundant rotation sensor 9 is intermittently operated, and a detection of the motor rotational angle is continued, whereby the rudder angle can be detected without a problem even when the ignition is turned off and a handle is rotated. The redundant rotation sensor 9 is intermittently operated, and the motor rotational angle is detected, whereby the consumption current can be reduced. When the ignition is turned off and an engine is not operated, and a battery is not charged by an alternator, and it is required that the consumption current is reduced, this operation is an effective means.

In general, when the rotation sensor is separated from the magnet 20 with a long distance, a magnetic flux density, which is detected by the rotation sensor, is decreased, so that the output accuracy of the rotation sensor is decreased. However, when the redundant rotation sensor 9 is used as a rudder angle sensor, the output accuracy of the sensor used for controlling a motor is not required, so that it can be possible as illustrated in FIG. 3 that the redundant rotation sensor 9 is mounted at a surface, which is distant from the magnet 20, of the rotation sensor board 17.

Embodiment 2

In the following Embodiment 2, a difference form Embodiment 1 will be mainly explained. After a fault of a rotation sensor is detected, in order to continue an assist operation by a system, the following realization method is used in Embodiment 2.

Figure 10:
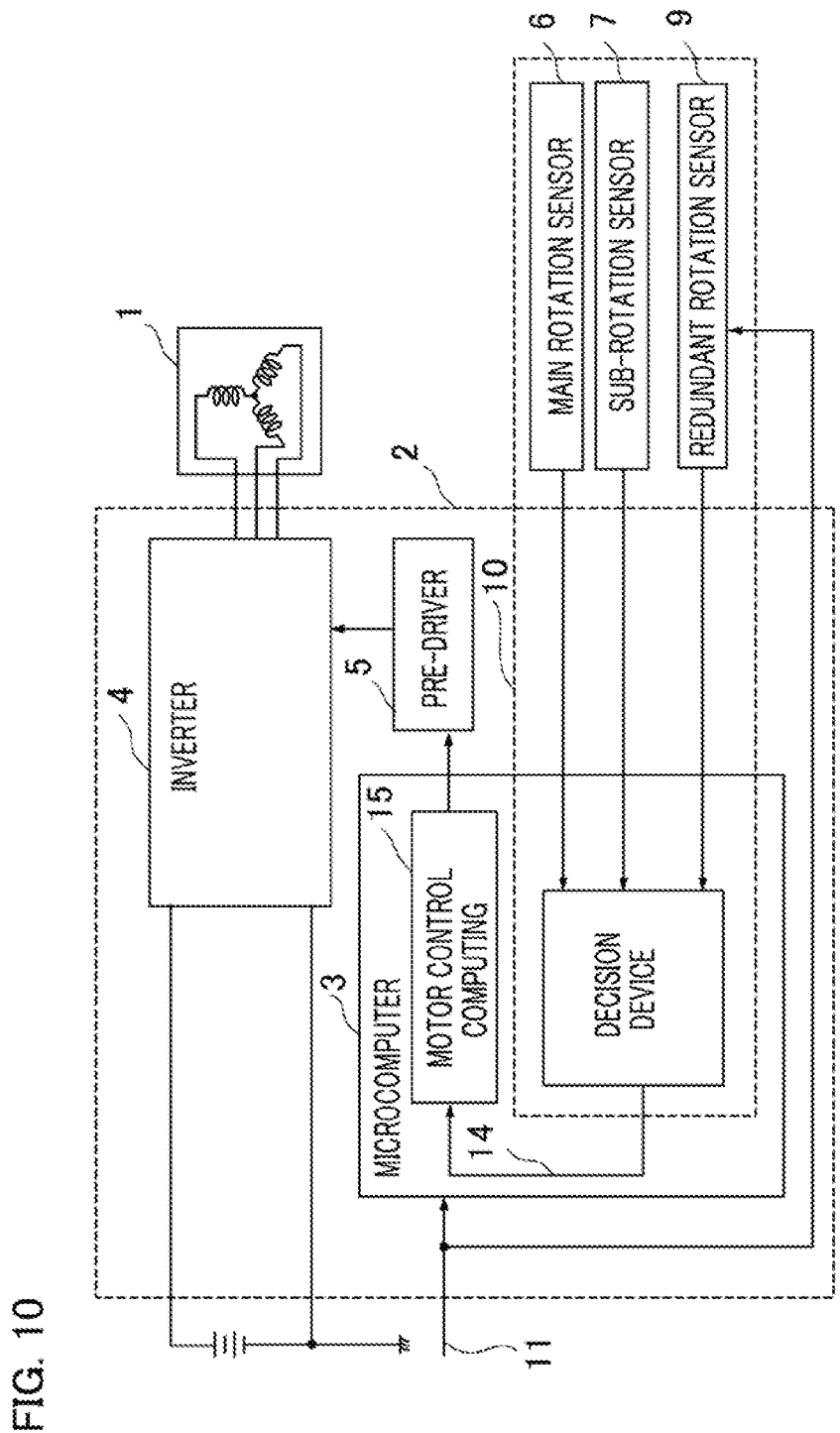
FIG. 10 is a block diagram illustrating a motor control system in which a motor rotational angle detection device according to Embodiment 2 of the present invention is used for an electric power steering device.

FIG. 10 is a block diagram illustrating a motor control system in which a motor rotational angle detection device according to Embodiment 2 of the present invention is used for an electric power steering device. The three output values of the main rotation sensor 6, the sub-rotation sensor 7, and the redundant rotation sensor 9 are constantly compared with each other, when any sensor indicates an output value which is different from the other output values, the output values at a majority side are used as a normal rotational angle by using a majority rule, whereby the assist operation is continued.

Moreover, when the majority rule is used, although the sensors, of which number is greater than or equal to at least three, are required, when two output values are finally used in a case where a difference (in other words, a predetermined value, for example, a difference which is greater than or equal to 10%) is caused between the output values of the sensors, it is informed to a microcomputer at the outside that an abnormality is caused in a motor rotational angle detection device 10. Thereby when a single fault is caused, a normal rotational angle sensor is identified, and a normal rotational angle can be continuously outputted. However, when a fault is more caused, and a normal rotational angle sensor cannot be finally identified, it is informed to the microcomputer that an abnormality is caused in the motor rotational angle detection device 10, whereby it can be prevented that an abnormal rotational angle is used.

Figure 11:
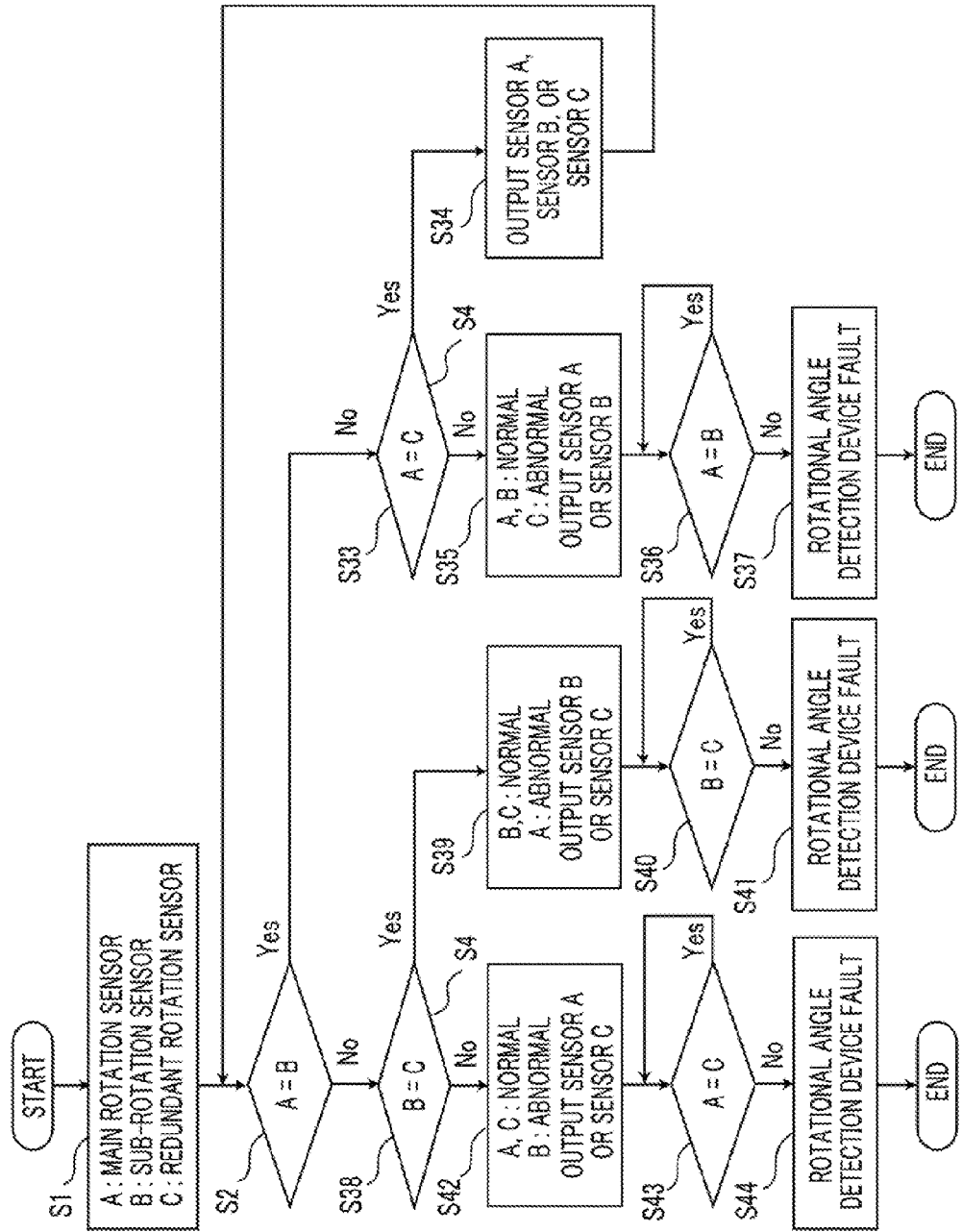
FIG. 11 is a flowchart for explaining an operation of the motor rotational angle detection device according to Embodiment 2.

FIG. 11 is a flowchart for explaining an operation of the motor rotational angle detection device according to Embodiment 2. The operation, which is different from the operation in the flowchart indicated in FIG. 7, will be explained. The output A is compared with the output B at S2, and when a difference is not caused (S2, Yes), the output A is compared with the output C at S33, and when a difference is not caused (S33, Yes), the output A, the output B, or the output C of the rotational angle is outputted (S34). When a difference is caused at S33 (S33, No), it is decided that the output A is normal and the output B is normal and the output C is abnormal, and the output A or the output B is outputted (S35). Moreover, when a difference is caused between the output A and the output B (S36, No), it is decided that a fault is caused in the motor rotational angle detection device 10 (S37). On the other hand, the output A is compared with the output B at S2, and when a difference is caused (S2, No), the output B is compared with the output C at S38, and when a difference is not caused (S38, Yes), it is decided that the output B is normal and the output C is normal and the output A is abnormal, and the output B or the output C is outputted (S39). Moreover, when a difference is caused between the output B and the output C (S40, No), it is decided that a fault is caused in the motor rotational angle detection device 10 (S41). On the other hand, the output B is compared with the output C at S38, and when a difference is caused (S38, No), it is decided that the output A is normal and the output C is normal and the output B is abnormal, and the output A or the output C is outputted (S42). Moreover, when a difference is caused between the output A and the output C (S43, No), it is decided that a fault is caused in the motor rotational angle detection device 10 (S44).

As illustrated in FIG. 3 and FIG. 4, when a plurality of rotation sensors are arranged on a rotation sensor board 17, any sensor may continuously measure a rotational angle when an ignition is turned off. Thereby when a fault is caused in any sensor, a sensor, which is decided as a normal sensor by the normal angle decision device 8, continuously detects the rotational angle when the ignition is turned off, whereby the sensor used as a rudder angle sensor can continuously generate a normal output value when a fault is caused.

Embodiment 3

Figure 12:
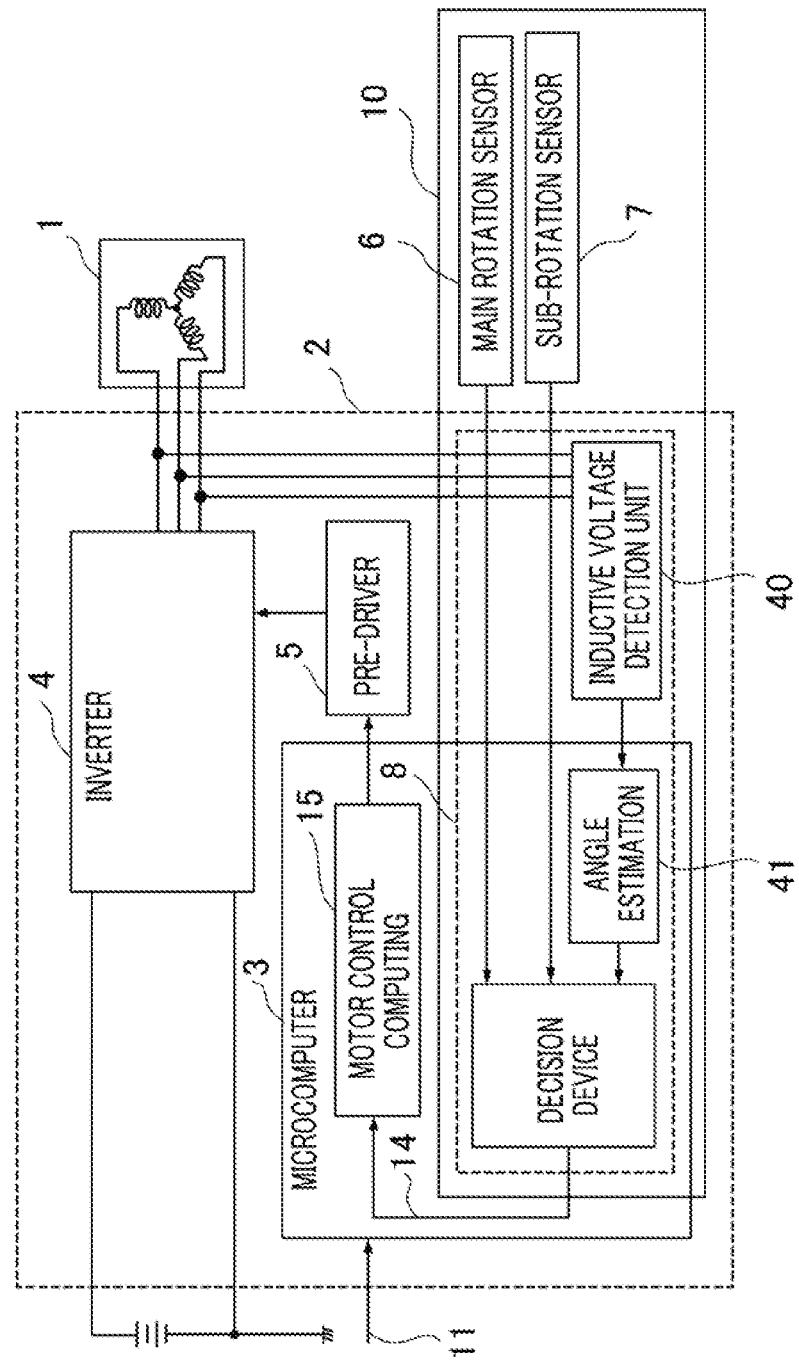
FIG. 12 is a block diagram illustrating a motor control system in which a motor rotational angle detection device according to Embodiment 3 of the present invention is used for an electric power steering device.

FIG. 12 is a block diagram illustrating a motor control system in which a motor rotational angle detection device according to Embodiment 3 of the present invention is used for an electric power steering device. When a difference is caused between an output value of a main rotation sensor 6 and an output value of a sub-rotation sensor 7, a normal angle decision device 8 decides a normal side by using an angle (a motor rotational angle information item) which is calculated by a microcomputer.

It is desirable that the sensors, which are faced to a shaft end of a motor and arranged, are arranged at a position extended from a shaft of the motor, and a number of the mounted sensors is limited. Therefore, when a redundant rotation sensor cannot be provided in order to obtain a motor rotational angle information item of the normal angle decision device 8, or when it is difficult that a cost of the device is increase, a process is performed by using software.

Figure 13:
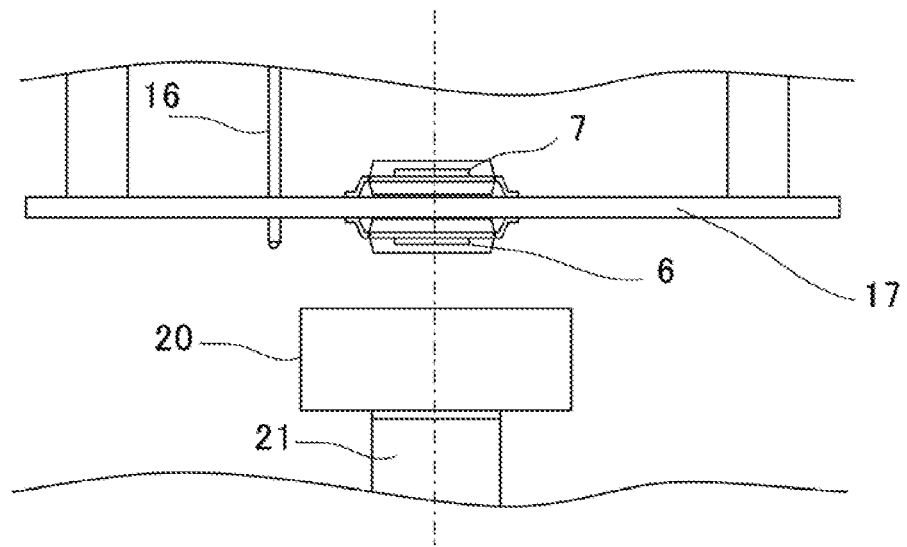
FIG. 13 is a cross-sectional view illustrating an arrangement of rotation sensors in the motor rotational angle detection device according to Embodiment 3.
Figure 14:
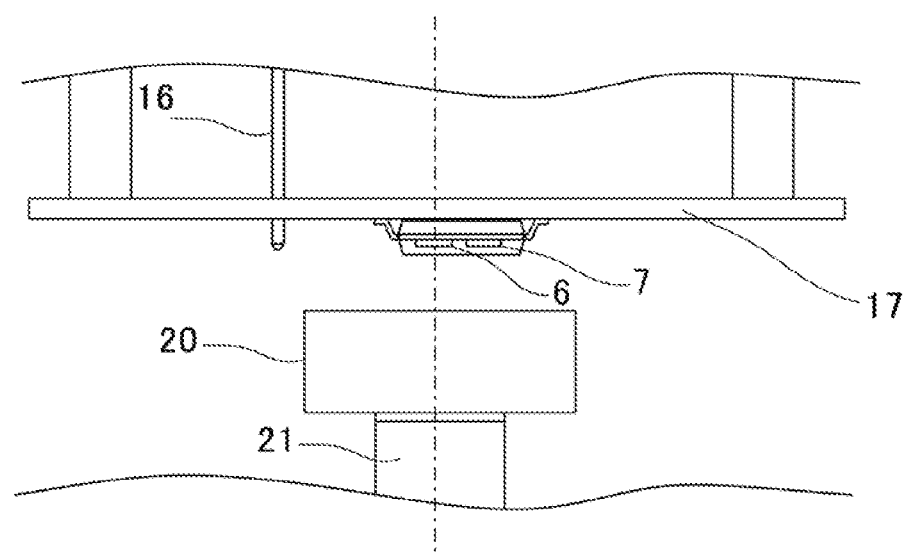
FIG. 14 is the other cross-sectional view illustrating an arrangement of the rotation sensors in the motor rotational angle detection device according to Embodiment 3.

A configuration of the motor rotational angle detection device will be explained in reference to FIG. 13. FIG. 13 is a cross-sectional view illustrating an arrangement of rotation sensors in the motor rotational angle detection device according to Embodiment 3. In FIG. 13, the main rotation sensor 6 and the sub-rotation sensor 7 are mounted on the both surfaces of a rotation sensor board 17. When two rotation sensors cannot be installed in the same package 12 as illustrated in FIG. 3, the two rotation sensors are mounted on the rotation sensor board 17 as illustrated in FIG. 13. In this case, space for mounting a redundant rotation sensor is not obtained, so that it is required that a motor rotational angle information item of the normal angle decision device 8 is obtained by using software. Moreover, there is a case in which the both surfaces of the rotation sensor board 17 cannot be used, and the two rotation sensors are mounted on one surface of the rotation sensor board 17. Even in this case, space for mounting a redundant rotation sensor is not obtained, so that it is required that a motor rotational angle information item of the normal angle decision device 8 is obtained by using software.

Hereinafter, an angle (a motor rotational angle information item), which is calculated by a microcomputer 3, will be explained. There is a following method in which the motor rotational angle information item is estimated without using the output value of the rotation sensor. When a motor 1 is rotated, the motor 1 generates an inductive voltage. The inductive voltage is varied in accordance with a rotational velocity and a rotational angle of the motor 1, so that a motor rotational velocity and a motor rotational position can be estimated by using the inductive voltage. As illustrated in FIG. 12, an angle estimation unit 41 estimates a motor rotational angle by using the inductive voltage which is obtained by an inductive voltage detection unit 40 for detecting the inductive voltage of the motor 1.

Although the detection accuracy of the estimated motor rotational angle is lower than the detection accuracy of the main rotation sensor 6 and the sub-rotation sensor 7 which are specifically provided as the motor rotation sensors, it is possible that the angle estimation unit 41, which is used as a normal angle decision device, has sufficient accuracy. Moreover, in a motor rotational angle information item which is used when a fault is caused, it is permitted that accuracy of a rotational angle is decreased. Therefore, when the main rotation sensor 6 or the sub-rotation sensor 7 is broken down, the motor rotational angle information item can be used as a motor rotational angle for continuing an assist operation when a backup operation is performed.

Figure 15:
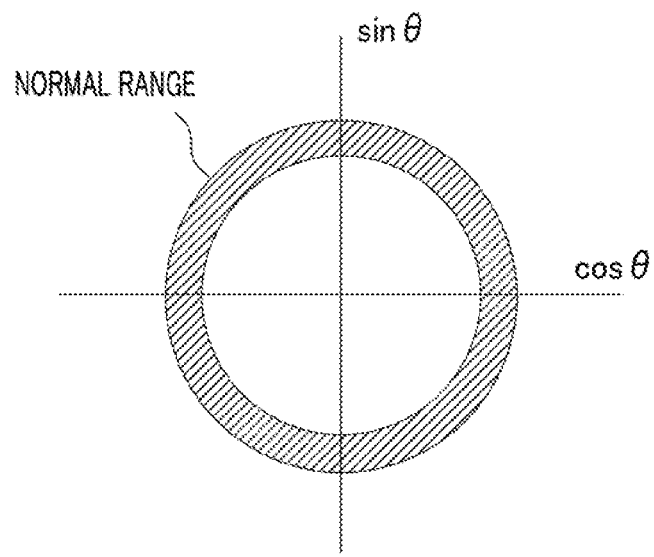
FIG. 15 is a view illustrating a Lissajous circle.

Moreover, in the other method, a Lissajous circle, which is illustrated in FIG. 15, is used as a motor rotational angle information item. A sign wave (sin θ) signal and a cosign wave (cos θ) signal, which are corresponded to a rotational angle θ of the motor 1, are outputted from the rotation sensors to the microcomputer 3. As illustrated in FIG. 15, a normal range is provided with respect to the Lissajous circle which is formed by using the sin θ signal and the cos θ signal, an abnormality of the decided sensor can be detected. For example, when a sin θ signal value of the main rotation sensor 6 is abnormal, and an upper limit value and a lower limit value, which are outputted when the main rotation sensor 6 is normal, are provided with respect to a radius of the Lissajous circle, an abnormal angle is detected when the angle is deviated from the range of the upper limit value and the lower limit value, so that an abnormality can be detected. Moreover, the range of the upper limit value and the lower limit value are arbitrarily regulated, whereby an angle range for deciding the abnormality can be arbitrarily defined.

Moreover, when the ignition is turned off, the main rotation sensor 6 or the sub-rotation sensor 7 is intermittently operated, and a detection of the motor rotational angle is continued, whereby the rudder angle can be detected without a problem even when the ignition is turned off and a handle is rotated. The main rotation sensor 6 or the sub-rotation sensor 7 is intermittently operated, and the motor rotational angle is detected, whereby the consumption current can be reduced.

Embodiment 4

Figure 16:
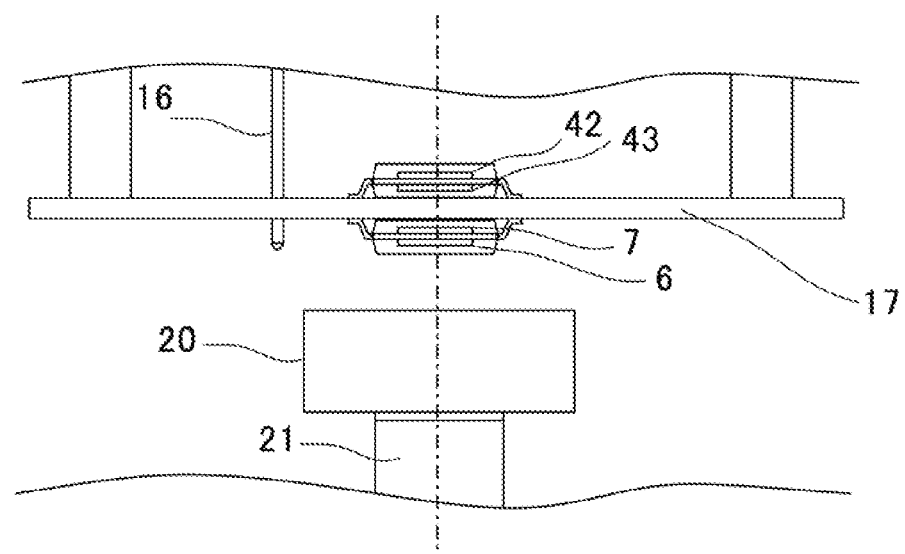
FIG. 16 is a cross-sectional view illustrating an arrangement of rotation sensors in a motor rotational angle detection device according to Embodiment 4.

FIG. 16 is a cross-sectional view illustrating an arrangement of rotation sensors in a motor rotational angle detection device according to Embodiment 4. In FIG. 16, the rotation sensors are mounted on the both surfaces of a rotation sensor board 17. A first main rotation sensor 6 and a first sub-rotation sensor 7 are mounted on one surface, and a second main rotation sensor 42 and a second sub-rotation sensor 43 are mounted on the other surface. In this case, an output value of the first main rotation sensor 6 is compared with an output value of the first sub-rotation sensor 7, whereby it can be detected that an abnormality is caused in the first main rotation sensor 6 or the first sub-rotation sensor 7. In a similar way, an output value of the second main rotation sensor 42 is compared with an output value of the second sub-rotation sensor 43, whereby it can be detected that an abnormality is caused in the second main rotation sensor 42 or the second sub-rotation sensor 43.

In Embodiment 4, the first main rotation sensor 6 and the first sub-rotation sensor 7 are installed in the same package, and the second main rotation sensor 42 and the second sub-rotation sensor 43 are installed in the same package. When a difference is caused between the output value of the first main rotation sensor 6 and the output value of the first sub-rotation sensor 7, and a difference is not caused between the output value of the second main rotation sensor 42 and the output value of the second sub-rotation sensor 43, the output value of the second main rotation sensor 42 or the output value of the second sub-rotation sensor 43 is used as a normal motor rotational angle. In other words, even when a fault is caused, the output values of the two rotation sensors, in which a difference is small, in a plurality of rotation sensors are used, whereby it can be continued that the normal output values are outputted.

In such a case where the first main rotation sensor 6 and the first sub-rotation sensor 7 are installed in the same package, there is a possibility in which the sensors are concurrently broken down by a power source fault, a short circuit between pins or the like. Therefore, in this case, the output value of the second main rotation sensor 42 or the output value of the second sub-rotation sensor 43, which are installed in the other package, is used as a normal motor rotational angle, whereby the reliability is improved. Moreover, after a difference is caused between the output value of the first main rotation sensor 6 and the output value of the first sub-rotation sensor 7, when a difference is caused between the output value of the second main rotation sensor 42 and the output value of the second sub-rotation sensor 43 in a state where a normal rotational angle sensor cannot be finally identified, it is informed to a microcomputer at the outside that an abnormality is caused in a motor rotational angle detection device 10, whereby it can be prevented that an abnormal rotational angle is used.

FIG. 17 is a flowchart for explaining an operation of the motor rotational angle detection device according to Embodiment 4. An output A (rotational angle) is obtained from the first main rotation sensor 6, and an output B is obtained from first the sub-rotation sensor 7, and an output C is obtained from the second main rotation sensor 42, and an output D is obtained from the second sub-rotation sensor 43 (S51). The output A is compared with the output B at S52, and when a difference is not caused (S52, Yes), the output C is compared with the output D at S53, and when a difference is not caused (S53, Yes), the output A, the output B, the output C, or the output D is outputted as a normal rotational angle (S54). On the other hand, the output A is compared with the output B at S52, and when a difference is caused (S52, No), the output C is compared with the output D at S55, and when a difference is not caused (S55, Yes), it is decided that the output A and the output B are abnormal and the output C and the output D are normal, and the output C or the output D is outputted as a normal rotational angle (S56). Moreover, the output C is compared with the output D at S55, and when a difference is caused (S55, No), it is decided that a fault is caused in the motor rotational angle detection device 10 (S57). On the other hand, the output C is compared with the output D at S53, and when a difference is caused (S53, No), it is decided that the output A and the output B are normal and the output C and the output D are abnormal, and the output A or the output B is outputted as a normal rotational angle (S58). Moreover, the output A is compared with the output B at S59, and when a difference is caused (S59, No), it is decided that a fault is caused in the motor rotational angle detection device 10 (S60).

Moreover, in the electric power steering device, when the ignition is turned off, one or two rotation sensors in the rotation sensors are intermittently operated as explained in Embodiment 1, and a detection of the rotational angle is continued. Thereby, a rudder angle can be detected. Moreover, two rotation sensors are operated as rudder angle sensors, and when a difference is caused between the output values of the both rotation sensors, it can be detected that an abnormality is caused in the rotational angles of the rudder angle sensors.

In addition, it is possible in the scope of the present invention that each of the embodiments is freely combined, or each of embodiments is suitably modified or omitted.

What is claimed is:

1. A motor rotational angle detection device comprising:
    a first rotation sensor configured to detect a first rotational angle of a motor;
    a second rotation sensor configured to detect a second rotational angle of the motor;
    a third rotation sensor configured to detect a third rotational angle of the motor; and
    a normal angle decision device configured to:
        determine whether the detected first rotational angle is equal to the detected second rotational angle;
        in response to the determination that the detected first rotational angle is different from the detected second rotational angle, determine a smallest difference among a first difference between the detected first rotational angle and the detected third rotational angle and a second difference between the detected second rotational angle and the detected third rotational angle;
        identify a rotation sensor corresponding to the determined smallest difference, among the first rotation sensor and the second rotation sensor, as a normal rotation sensor; and
    decide and output a rotational angle of the motor that is detected by the identified normal rotation sensor, as a normal rotational angle of the motor.

2. The motor rotational angle detection device as recited in claim 1, wherein the first rotation sensor comprises a main rotation sensor,
    the second rotation sensor comprises a sub-rotation sensor,
    the third rotation sensor comprises a redundant rotation sensor.

3. The motor rotational angle detection device as recited in claim 2, wherein each of the main rotation sensor, the sub-rotation sensor, and the redundant rotation sensor comprises magnetic detection elements, is mounted on a board facing a magnet attached to a shaft end of the motor, and is configured to detect a magnet field variation of the magnet.

4. The motor rotational angle detection device as recited in claim 3, wherein the two rotation sensors among the main rotation sensor, the sub-rotation sensor, and the redundant rotation sensor are mounted on a surface of the board, and
    a remaining rotation sensor among the main rotation sensor, the sub-rotation sensor, and the redundant rotation sensor is mounted on another surface of the board.

5. The motor rotational angle detection device as recited in claim 4, wherein the two rotation sensors are concurrently arranged at a position that is extended from a shaft of the motor.

6. The motor rotational angle detection device as recited in claim 4, wherein the main rotation sensor, the sub-rotation sensor, and the redundant rotation sensor are arranged at a position that is extended from a shaft of the motor.

7. The motor rotational angle detection device as recited in claim 3, wherein the redundant rotation sensor is mounted on a surface of the board, the surface being distant from the shaft end of the motor.

8. The motor rotational angle detection device as recited in claim 3, wherein at least two of the main rotation sensor, the sub-rotation sensor, and the redundant rotation sensor have different output formats.

9. An electric power steering device in which the motor rotational angle detection device as recited in claim 3, is used, and the motor is used as a driving motor, wherein one of the main rotation sensor, the sub-rotation sensor, and the redundant rotation sensor is mounted on a surface of the board, the surface being distant from the shaft end of the motor, and is further configured to continue to detect a rotational angle of the motor when an ignition of a vehicle is turned off.

10. An electric power steering device in which the motor rotational angle detection device as recited in claim 2, is used, and the motor is used as a driving motor, wherein the redundant rotation sensor is further configured to:
    detect the third rotational angle when an ignition of a vehicle is turned on, and
    continue to detect the third rotational angle when the ignition of the vehicle is turned off.

11. The motor rotational angle detection device as recited in claim 1, wherein the normal angle decision device is further configured to output the detected third rotational angle as the normal rotational angle.

12. The motor rotational angle detection device as recited in claim 1, wherein is further configured to:
    determine whether the normal rotational angle is equal to the detected third rotational angle;
    in response to the determination ha the detected rotational angle is different from the detected third rotational angle, inform an external device of an abnormality of the motor rotational angle detection device.

13. The motor rotational angle detection device as recited in claim 1, wherein the normal angle decision device is further configured to, in response to the first difference or the second difference being greater than or equal to a predetermined value, inform an external device of an abnormality of the motor rotational angle detection device.

14. The motor rotational angle detection device as recited in claim 1, wherein each of the first rotation sensor, the second rotation sensor, and the third rotation sensor comprises magnetic detection elements, is mounted on a board facing a magnet attached to a shaft end of the motor, and is configured to detect a magnet field variation of the magnet, and
    the motor rotational angle detection device further comprises a microcomputer of a control unit for controlling the motor, the microcomputer comprising the normal angle decision device.

15. The motor rotational angle detection device as recited in claim 14, wherein one of the first rotation sensor, the second rotation sensor, and the third rotation sensor is provided at a surface of the board, and
    another one of the first rotation sensor, the second rotation sensor, and the third rotation sensor is provided at another surface of the board.

16. The motor rotational angle detection device as recited in claim 14, wherein two of the first rotation sensor, the second rotation sensor, and the third rotation sensor are provided at a surface of the board.

17. An electric power steering device in which the motor rotational angle detection device as recited in claim 1, is used, and the motor is used as a driving motor, wherein either one or both of the first rotation sensor and the second rotation sensor is further configured to continue to detect a rotational angle of the motor when an ignition of a vehicle is turned off.

18. The electric power steering device as recited in claim 17, wherein a rudder angle information item is determined based on the rotational angle detected when the ignition of the vehicle is turned off.

19. A motor rotational angle detection device comprising:
   a first rotation sensor configured to detect a first rotational angle of a motor;
   a second rotation sensor configured to detect a second rotational angle of the motor;
   a third rotation sensor configured to detect a third rotational angle of the motor; and
   a normal angle decision device configured to:
      determine whether a rotational angle among the detected first rotational angle, the detected second rotational angle, and the detected third rotational angle is different from remaining rotational angles among the detected first rotational angle, the detected second rotational angle, and the detected third rotational angle;
      in response to the determination that the rotational angle is different from the remaining rotational angles, identify rotation sensors corresponding to the remaining rotational angles, as normal motor rotation sensors, and determine whether the remaining rotational angles are different; and
      in response to the determination that the remaining rotational angles are different, inform an external device of an abnormality of the motor rotational angle detection device.

20. A motor rotational angle detection device comprising:
   a first rotation sensor configured to detect a first rotational angle of a motor;
   a second rotation sensor cc guyed to detect a second rotational angle of the motor, the first rotation sensor and the second rotation sensor being a first pair of rotation sensors;
   a third rotation sensor configured to detect a third rotational angle of the motor;
   a fourth sensor configured to detect a fourth rotational angle of the motor, the third rotation sensor and the fourth rotation sensor being a second pair of rotation sensors; and
   a normal angle decision device configured to:
      determine whether the detected first rotational angle is equal to the detected second rotational angle, and whether the detected third rotational angle is equal to the detected fourth rotational angle;
      in response to the determination that the detected first rotational angle is equal to the detected second rotational angle, and the detected third rotational angle is different from the detected fourth rotational angle, identify the first pair of rotation sensors as normal rotation sensors, and determine again whether the detected first rotational angle is equal to the detected second rotational angle;
      in response to the determination that the detected first rotational angle is different from the detected second rotational angle, and the detected third rotational angle is equal to the detected fourth rotational angle, identify the second pair of rotation sensors as the normal rotation sensors, and determine again whether the detected third rotational angle is equal to the detected fourth rotational angle;
      in response to the determination that the detected first rotational angle is different from the detected second rotational angle, and the detected third rotational angle is different from the detected fourth rotational angle, inform and external device of an abnormality of the motor rotational angle detection device.

* * * * *